US012323935B2

(12) United States Patent
Zhang

(10) Patent No.: US 12,323,935 B2
(45) Date of Patent: Jun. 3, 2025

(54) METHOD AND DEVICE OF TRANSMISSION RELATING TO SYNCHRONIZATION AND DUAL LINK FOR WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 498 days.

(21) Appl. No.: 17/737,039

(22) Filed: May 5, 2022

(65) Prior Publication Data

US 2022/0264501 A1 Aug. 18, 2022

Related U.S. Application Data

(63) Continuation of application No. PCT/CN2020/121363, filed on Oct. 16, 2020.

(30) Foreign Application Priority Data

Nov. 9, 2019 (CN) .......................... 201911090952.6

(51) Int. Cl.
*H04W 56/00* (2009.01)
(52) U.S. Cl.
CPC ... *H04W 56/0045* (2013.01); *H04W 56/0015* (2013.01)
(58) Field of Classification Search
None
See application file for complete search history.

(56) References Cited

U.S. PATENT DOCUMENTS

2017/0127251 A1 5/2017 Yi
2018/0124808 A1 5/2018 Yang
(Continued)

FOREIGN PATENT DOCUMENTS

CN 105684538 A 6/2016
CN 106162597 A 11/2016
(Continued)

OTHER PUBLICATIONS

ISR received in application No. PCT/CN2020/121363 dated Jan. 5, 2021.
(Continued)

*Primary Examiner* — Saad Khawar
(74) *Attorney, Agent, or Firm* — Ascenda Law Group, PC

(57) ABSTRACT

The present disclosure provides a method and a device for wireless communications. A first node receives a first signaling and a second signaling; and transmits a first radio signal in a first slot; herein, the first signaling is used for indicating a first time window, an index for the first slot in the first time window is a first index, the second signaling is used for determining a first time offset; when the first radio signal is transmitted in a mainlink, the first index is used for generating the first radio signal; when the first radio signal is transmitted in a sidelink, the second index is used for generating the first radio signal, the second index is related to both the first time offset and the first index. By adjusting and optimizing timing relations between different nodes by different indexes, the present disclosure prevents interferences and increases the efficiency.

11 Claims, 7 Drawing Sheets

(56) References Cited

U.S. PATENT DOCUMENTS

| | | | |
|---|---|---|---|
| 2019/0036738 A1* | 1/2019 | Miao | H04L 25/02 |
| 2019/0289561 A1 | 9/2019 | Corley | |
| 2021/0051638 A1* | 2/2021 | Lu | H04L 5/0053 |
| 2021/0212101 A1* | 7/2021 | Jiang | H04B 7/01 |
| 2021/0377989 A1* | 12/2021 | Chae | H04L 1/1861 |

FOREIGN PATENT DOCUMENTS

| | | | |
|---|---|---|---|
| CN | 106256099 A | 12/2016 | |
| CN | 106465167 A | 2/2017 | |
| CN | 106538023 A | 3/2017 | |
| CN | 106664189 A | 5/2017 | |
| CN | 108616840 A | 10/2018 | |
| CN | 109005585 A | 12/2018 | |
| CN | 109804678 A | 5/2019 | |
| CN | 109891959 A | 6/2019 | |
| CN | 110140408 A | 8/2019 | |
| CN | 110234170 A | 9/2019 | |
| CN | 110419186 A | 11/2019 | |
| IN | 107005799 A | 8/2017 | |
| IN | 107046461 A | 8/2017 | |
| IN | 110266465 A | 9/2019 | |
| WO | 2018031061 A1 | 2/2018 | |

OTHER PUBLICATIONS

Supplementary Search Report of Chinses patent application No. CN201911090952.6 dated May 7, 2022.
Supplementary Search Report of Chinses patent application No. CN201911090952.6 dated Jan. 4, 2022.
Notification to Grant Patent Right for Invention of Chinses patent application No. CN201911090952.6 dated May 16, 2022.
First Office Action of Chinses patent application No. CN201911090952.6 dated Aug. 30, 2021.
Second Office Action of Chinses patent application No. CN201911090952.6 dated Jan. 12, 2022.
First Search Report of Chinses patent application No. CN201911090952.6 dated Aug. 20, 2021.
Ericsson DFN Offset for V2V 3GPP TSG-RAN WG2 #95bis R2-166979 Oct. 1, 2016.
Huawei, HiSilicon Remaining issues on DFN offset 3GPP TSG RAN WG2 Meeting #97 R2-1701373 Feb. 3, 2017.
MediaTek Inc. Discussion on sidelink based synchronization mechanism 3GPP TSG RAN WG1 #98bis R1-1911068 Oct. 8, 2019.
CATT Consideration on DFN offset 3GPP TSG-RAN WG2 Meeting #97 R2-1701238 Feb. 3, 2017.
Qualcomm Incorporated LTE Device to Device Proximity Services 3GPP TSG RAN meeting #66 RP-141894 Dec. 3, 2014.
Ericsson Running RRC CR for Rel-13 low complexity UEs and coverage enhancements 3GPP TSG-WG2 Meeting #91bis R2-154651 Sep. 25, 2015.

* cited by examiner

First signaling —used to indicate→ First time window

Second signaling —used to determine→ First time offset

First index —used for generating→ First radio signal

Second index —used for generating→ First radio signal

First reference time offset value set —used to determine→ First time offset

FIG. 16
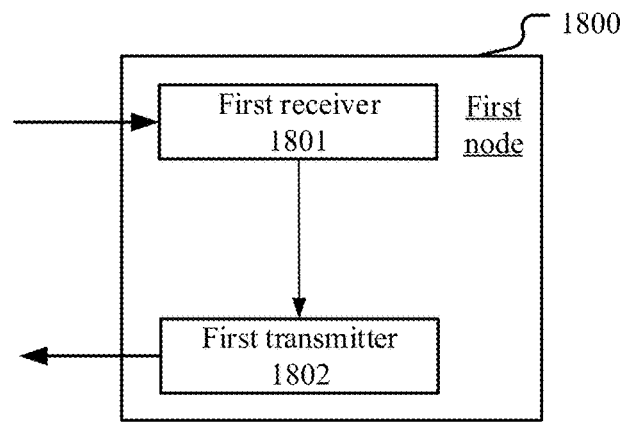
FIG. 17
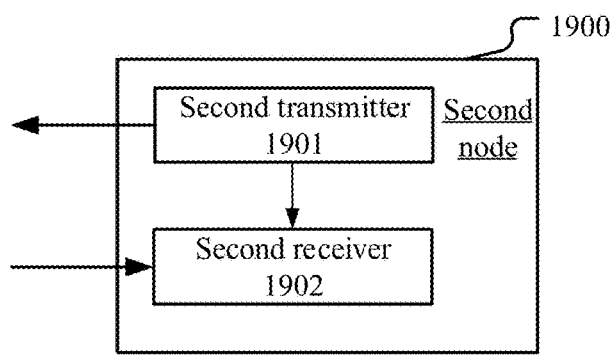
FIG. 18
FIG. 19
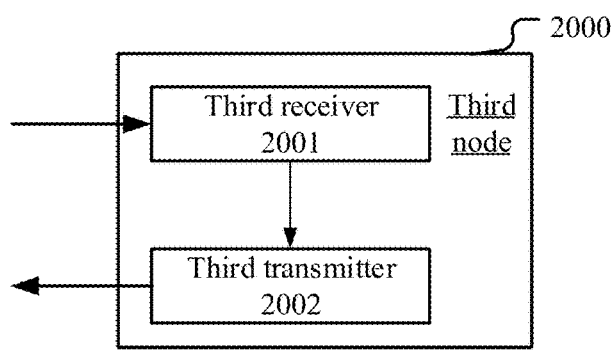
FIG. 20

METHOD AND DEVICE OF TRANSMISSION RELATING TO SYNCHRONIZATION AND DUAL LINK FOR WIRELESS COMMUNICATION

CROSS REFERENCE TO RELATED APPLICATIONS

This application is a continuation of International Patent application No. PCT/CN2020/121363, filed on Oct. 16, 2020, which claims the priority benefit of Chinese Patent Application No. 201911090952.6, filed on Nov. 9, 2019, the full disclosure of which is incorporated herein by reference.

BACKGROUND

Technical Field

The present disclosure relates to transmission methods and devices in wireless communication systems, and in particular to a method and a device of transmission relating to synchronization and dual link in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves signal timing and synchronization, particularly when both mainlink and sidelink exist, and determining the timing and synchronization among multiple nodes, which play an important role in the normally ongoing communication of a base station or a User Equipment (UE), rational scheduling of resources, and also in effective coordination for system interferences, thus laying a solid foundation for increasing throughput and the spectrum utilization. Therefore, LTE and 5G are indispensable no matter in enhanced Mobile BroadBand (eMBB), Ultra Reliable Low Latency Communication (URLLC) or enhanced Machine Type Communication (eMTC). And a wide range of applications can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN), or combined, radio resource management and multi-antenna codebook selection.

With the increase of numbers of nodes and links, higher demands have been posed on timing, synchronization and orderly coordination within an entire network, and the compatibility between different versions of systems shall be considered for system designing.

SUMMARY

In different scenarios of communications, due to difficulties confronting either a transmitter or a receiver for signals, or, transmission delay in communications, or biases that occur at a signal transmission time resulting from undesirable apparatus, the processing or forwarding or coordination of signals can be hard to achieve. In particular, when multiple nodes are involved, the synchronization among these nodes becomes an important issue. When synchronization reference sources for the nodes are various, for instance, some use GPS or GNSS or the like as a synchronization reference source, while others use local nodes or so as a synchronization reference source, their synchronization is potentially inconsistent, which may lead to interference and a reduction in resource efficiency, no connection to be set up between nodes for effective communications, as well as all kinds of confusion. On the other hand, the standard, precision and geographical location can vary according to different systems, and near field communications may differ from distant communications, or various communication scenarios may be mixed, all of these uncertainties will make the system design a problem.

To address the above problem, the present disclosure provides a solution.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
  receiving a first signaling and a second signaling; and
  transmitting a first radio signal in a first slot;
    wherein, the first signaling is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, a problem to be solved in the present disclosure comprises: how to ensure synchronization in the presence of offsets among different synchronization sources, and how to keep synchronization information in a sidelink in consistency with a synchronization source in a mainlink in cases when there is a larger transmission delay or usage of synchronization compensation. The method determines synchronization information for the sidelink in a rational way according to factors such as different transmission delays and local compensation processing, hence the solution to the problem.

In one embodiment, characteristics of the above method include: the first index comprises a System Frame Number (SFN) of a mainlink, the second index comprises a Direct Frame Number (DFN), the first time offset comprises an actual Timing Advance (TA) for the mainlink, and the second index is related to both the first time offset and the first index.

In one embodiment, an advantage of the above method comprises: overcoming the timing offset from the first node to its synchronization source and the issue of timing brought about by transmission, thus determining synchronization information in sidelink more accurately.

Specifically, according to one aspect of the present disclosure, characterized in that the first transmitter transmits a second radio signal;

wherein, the second radio signal indicates a second time window, an index for the first slot in the second time window is the second index.

In one embodiment, characteristics of the above method include: the first time window is used for mainlink communications, while the second time window is used for sidelink communications.

Specifically, according to one aspect of the present disclosure, characterized in that the first transmitter transmits a third radio signal; wherein, the third radio signal indicates a first time-frequency resource pool in the second time window.

Specifically, according to one aspect of the present disclosure, characterized in that the second signaling and a location of the first node are jointly used to determine the first time offset.

Specifically, according to one aspect of the present disclosure, characterized in that the first receiver receives a third signaling, the third signaling indicates a first reference time offset value set, and the first reference time offset value set is used for determining the first time offset.

Specifically, according to one aspect of the present disclosure, characterized in that the first receiver receives a fourth signaling, the fourth signaling indicates a second time offset, and the second time offset is used for determining the first time offset.

Specifically, according to one aspect of the present disclosure, characterized by:
  receiving a fifth radio signal on time-frequency resources in the first time-frequency resource pool.

Specifically, according to one aspect of the present disclosure, characterized in that the first node is a UE.

Specifically, according to one aspect of the present disclosure, characterized in that the first node is a relay node.

The present disclosure provides a method in a second node for wireless communications, comprising:
  transmitting a first signaling and a second signaling; and
  receiving a first radio signal in a first slot;
  wherein, the first signaling is used for indicating a first time window, an index for the first slot in the first time window is a first index, and the second signaling is used for determining a first time offset; when the first radio signal is transmitted on a mainlink, a first index is used for generating the first radio signal; when a transmitter for the first radio signal transmits the first radio signal on a sidelink, a second index is used for generating the first radio signal, the second index is related to both the first time offset and the first index.

Specifically, according to one aspect of the present disclosure, characterized in that the second signaling and a location of the first node are jointly used to determine the first time offset.

Specifically, according to one aspect of the present disclosure, characterized by transmitting a third signaling, the third signaling indicates a first reference time offset value set, and the first reference time offset value set is used for determining the first time offset.

Specifically, according to one aspect of the present disclosure, characterized by transmitting a fourth signaling, the fourth signaling indicates a second time offset, and the second time offset is used for determining the first time offset.

The present disclosure provides a method in a third node for wireless communications, comprising:
  receiving a first radio signal in a first slot;
  wherein, a first signaling is used for indicating a first time window, an index for the first slot in the first time window is a first index, and a second signaling is used for determining a first time offset; when a transmitter for the first radio signal transmits the first radio signal on a mainlink, the first index is used for generating the first radio signal; when the first radio signal is transmitted on a sidelink, a second index is used for generating the first radio signal, the second index is related to both the first time offset and the first index.

In one embodiment, a first signaling is transmitted by a receiver for a first radio signal transmitted on the mainlink.

In one embodiment, a first signaling is transmitted by a transmitter for the first radio signal.

In one embodiment, a second signaling is transmitted by a receiver for a first radio signal transmitted on the mainlink.

In one embodiment, a second signaling is transmitted by a transmitter for the first radio signal.

In one embodiment, a first signaling is transmitted by a serving cell for the third node.

In one embodiment, a second signaling is transmitted by a serving cell for the third node.

Specifically, according to one aspect of the present disclosure, characterized by receiving a second radio signal;
  wherein, the second radio signal indicates a second time window, an index for the first slot in the second time window is the second index.

Specifically, according to one aspect of the present disclosure, characterized by receiving a third radio signal;
  wherein, the third radio signal indicates a first time-frequency resource pool in the second time window.

Specifically, according to one aspect of the present disclosure, characterized in that the second signaling and a location of a transmitter for the first radio signal are jointly used to determine the first time offset.

Specifically, according to one aspect of the present disclosure, characterized by:
  the third signaling indicates a first reference time offset value set, and the first reference time offset value set is used for determining the first time offset.
  wherein, the third signaling is transmitted to a transmitter for the first radio signal by a synchronization reference source for a transmitter for the first radio signal.

Specifically, according to one aspect of the present disclosure, characterized by:
  the fourth signaling indicates a second time offset, the second time offset being used to determine the first time offset.
  wherein, the fourth signaling is transmitted to a transmitter for the first radio signal by a synchronization reference source for a transmitter for the first radio signal.

Specifically, according to one aspect of the present disclosure, characterized by:
  determining a synchronization reference source;
  wherein, whether the transmitter for the first radio signal is determined as a synchronization reference source is related to the second time window.

In one embodiment, when a second time window transmitted by a transmitter for the first radio signal indicates that there is a non-zero offset between a start of the second time window and a start of the first time window transmitted by the transmitter for the first radio signal, the transmitter for the first radio signal is determined to be a synchronization reference source.

In one embodiment, when the second time window transmitted by a transmitter for the first radio signal contains an indication of using pre-compensation, the transmitter for the first radio signal is determined to be a synchronization reference source.

In one embodiment, when a start of the second time window transmitted by the transmitter for the first radio signal is different from a start of a synchronization time window transmitted by a synchronization reference source for the transmitter for the first radio signal, the transmitter for the first radio signal is determined to be a synchronization reference source.

In one embodiment, when the second index transmitted by a transmitter for the first radio signal is different from the first index transmitted by the transmitter for the first radio signal, the transmitter for the first radio signal is determined to be a synchronization reference source.

Specifically, according to one aspect of the present disclosure, characterized by:

transmitting a fourth radio signal, a reception timing for a synchronization signal transmitted by a synchronization reference source determined by the third node is used to determine a transmission timing for the fourth radio signal.

Specifically, according to one aspect of the present disclosure, characterized by:

the fourth radio signal being transmitted on time-frequency resources in the first time-frequency resource pool;

transmitting a fourth radio signal, a transmission timing for a synchronization signal transmitted by a synchronization reference source determined by the third node is used to determine a transmission timing for the fourth radio signal.

Specifically, according to one aspect of the present disclosure, characterized by:

the fourth radio signal being transmitted on time-frequency resources in the first time-frequency resource pool.

Specifically, according to one aspect of the present disclosure, characterized by:

transmitting a fifth radio signal, the first radio signal is used to determine a transmission timing for the fifth radio signal, and a transmitter for the first radio signal is different from a synchronization reference source determined by the third node.

Specifically, according to one aspect of the present disclosure, characterized by:

the fifth radio signal being transmitted on time-frequency resources in the first time-frequency resource pool.

In one embodiment, the first time window information carried by the first radio signal is used to determine a transmission timing for the fifth radio signal.

In one embodiment, a start of the first time window carried by the first radio signal serving as a timing reference is used to determine a transmission timing for the fifth radio signal.

In one embodiment, compared with the prior art, the present disclosure is advantageous in the following aspects:

When the communications between the UE and its synchronization source is so distant and the transmission delay is so large, particularly when involving satellite communications, if, as provided in the traditional scheme, the synchronization information in the sidelink will be determined according to synchronization information in an uplink of the mainlink, even if they share a same synchronization source, the synchronization information transmitted on different sidelinks can be different, which means that different sidelinks are asynchronous. The present disclosure proposes to determine synchronization information for the sidelink, such as frame number, based on synchronization information for the synchronization source according to the time offset, thereby contributing to the synchronization between different sidelinks.

BRIEF DESCRIPTION OF THE DRAWINGS

Other features, objects and advantages of the present disclosure will become more apparent from the detailed description of non-restrictive embodiments taken in conjunction with the following drawings:

FIG. 16 illustrates a schematic diagram of a second signaling and a first node's location being jointly used to determine a first time offset according to one embodiment of the present disclosure.

FIG. 17 illustrates a schematic diagram of a second time offset used to determine a first time offset according to one embodiment of the present disclosure.

FIG. 18 illustrates a structure block diagram of a processing device in a first node according to one embodiment of the present disclosure.

FIG. 19 illustrates a structure block diagram of a processing device in a second node according to one embodiment of the present disclosure.

FIG. 20 illustrates a structure block diagram a processing device in a third node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
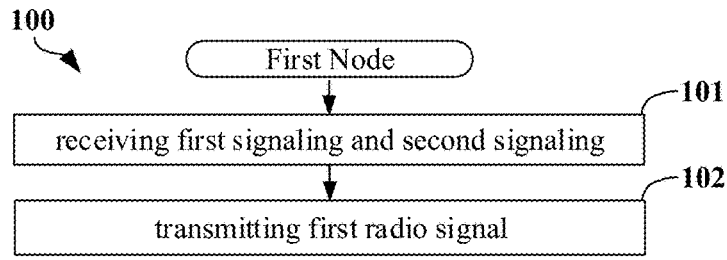
FIG. 1 illustrates a flowchart of a first signaling, a second signaling and a first radio signal according to one embodiment of the present disclosure.

Embodiment 1 illustrates a flowchart of transmission of a first signaling, a second signaling and a first radio signal according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure receives a first signaling and a second signaling in step 101; and transmits a first radio signal in step 102; wherein, the first signaling is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the mainlink is an uplink (UL), the first node is a UE.

In one embodiment, the first node is a UE, the mainlink is a link between the first node and a transmitter for the first signaling.

In one embodiment, the first node is a UE, the mainlink is an uplink, and the sidelink (SL) is a link from the first node to another UE.

In one embodiment, the first node is a satellite, the third node is a UE, the mainlink is a link from the satellite to the base station, and the sidelink (SL) is a link from the first node to the UE.

In one embodiment, the first node is a UE, the second node is another UE, the third node is a third UE, the mainlink is a link from the first node to the second node, and the sidelink (SL) is a link from the first node to the third node.

In one embodiment, the first node is a relay device, the second node is a base station, the third node is a UE, the mainlink is a link from the first node to the second node, and the sidelink (SL) is a link from the first node to the third node.

In one embodiment, a transmitter for the first signaling is a synchronization reference source for the first node.

In one embodiment, the first node is a candidate synchronization reference source for a receiver for the first radio signal.

In one embodiment, the synchronization reference source is a node to refer to for UE synchronization timing.

In one embodiment, the first time offset comprises a positive integer number of slot(s).

In one embodiment, a duration of the first slot does not exceed 10485.76 seconds.

In one embodiment, a duration of the first slot does not exceed 10.24 seconds.

In one embodiment, a duration of the first slot does not exceed 10 milliseconds.

In one embodiment, a duration of the first slot does not exceed 5 milliseconds.

In one embodiment, a duration of the first slot does not exceed 1 millisecond.

In one embodiment, a duration of the first slot does not exceed 0.5 millisecond.

In one embodiment, the first slot comprises 1 multicarrier symbol.

In one embodiment, the first slot comprises 7 multicarrier symbols.

In one embodiment, the first slot comprises 14 multicarrier symbols.

In one embodiment, the first slot comprises 140 multicarrier symbols.

In one embodiment, the multicarrier symbol is an Orthogonal Frequency Division Multiplexing (OFDM) Symbol.

In one embodiment, the multicarrier symbol is a Cyclic Prefix-Orthogonal Frequency-division Multiplexing (CP-OFDM) Symbol.

In one embodiment, the multicarrier symbol is a Single Carrier-Frequency Division Multiple Access (SC-FDMA) symbol.

In one embodiment, the multicarrier symbol is a Filter Bank Multicarrier (FBMC) symbol.

In one embodiment, the multicarrier symbol is a Discrete Fourier Transformation-Spread-Orthogonal Frequency Division Multiplexing (DFT-S-OFDM) Symbol.

In one embodiment, the multicarrier symbol is a Universal Filtered Multi-Carrier (UFMC) symbol.

In one embodiment, the multicarrier symbol is a Generalized frequency division multiplexing (GFDM) Symbol.

In one embodiment, the first signaling explicitly indicates the first index.

In one embodiment, the first index comprises a System Frame Number (SFN).

In one embodiment, the first index is used for generating an initial value of a first scrambling sequence, the first scrambling sequence being used for scrambling a first bit block, the first radio signal carrying the first bit block.

In one embodiment, the initial value of the first scrambling sequence is linear with the first index.

In one embodiment, a linear correlation coefficient of the initial value of the first scrambling sequence to the first index is 512.

In one embodiment, the first index is used for generating Cyclic Redundancy Check (CRC) of a first bit block, the first radio signal carrying the first bit block.

In one embodiment, the first index is used for generating an initial value of the Cyclic Redundancy Check (CRC) of a first bit block.

In one embodiment, the first radio signal is obtained by the first bit block sequentially through Channel Coding, Scrambling, Modulation, Layer Mapping, Precoding, Resource Mapping, and OFDM Symbol Generation.

In one embodiment, the first radio signal is obtained by the first bit block sequentially through Scrambling, CRC Coding, Channel Coding, Re-scrambling, Modulation, Resource Mapping, and OFDM Symbol Generation.

In one embodiment, the first index is used for generating an initial value of the CRC of a first bit block.

In one embodiment, the second index comprises a Direct Frame Number (DFN).

In one embodiment, the second index is used for generating an initial value of a second scrambling sequence, the second scrambling sequence being used for scrambling a second bit block, the first radio signal carrying the second bit block.

In one embodiment, the initial value of the second scrambling sequence is linear with the second index.

In one embodiment, a linear correlation coefficient of the initial value of the second scrambling sequence to the second index is 512.

In one embodiment, the second index is used for generating Cyclic Redundancy Check (CRC) of a second bit block, the first radio signal carrying the second bit block.

In one embodiment, the second index is used for generating an initial value of the Cyclic Redundancy Check (CRC) of a second bit block.

In one embodiment, the second index is used for generating an initial value of the CRC of a second bit block.

In one embodiment, the first radio signal is obtained by the second bit block sequentially through Channel Coding, Scrambling, Modulation, Layer Mapping, Precoding, Resource Mapping, and OFDM Symbol Generation.

In one embodiment, the first time window is composed of L1 slots, and the first index is an index of the first slot among the L1 slots, where L1 is a positive integer greater than 1.

In one embodiment, the first time window is composed of L1 slots, and the second index is an index of the first slot among the L1 slots, where L1 is a positive integer greater than 1.

In one embodiment, L1 is 1024, the L1 slots are contiguous.

In one embodiment, L1 is 10240, the L1 slots are contiguous.

In one embodiment, L1 is less than 1024, there is at least one slot interval, before which and after which there is a slot respectively belonging to the first time window.

In one embodiment, L1 is less than 10240, there is at least one slot interval, before which and after which there is a slot respectively belonging to the first time window.

In one embodiment, the phrase that the second index is related to both the first time offset and the first index comprises:
a difference between the second index and the first index is equal to the first time offset.

In one embodiment, the phrase that the second index is related to both the first time offset and the first index comprises:
a difference between the second index and the first index is linear with the first time offset.

In one embodiment, the phrase that the second index is related to both the first time offset and the first index comprises:
when the first time offset is smaller than a threshold A, a difference between the second index and the first index is equal to X; when the first time offset is smaller than a threshold B, a difference between the second index and the first index is equal to Y; when the threshold A and the threshold B are different, X is unequal to Y.

In one embodiment, the first signaling is transmitted through a Broadcast Channel (BCCH); the second signaling is transmitted through a Broadcast Channel (BCCH).

In one embodiment, the first signaling is transmitted through a Broadcast Channel (BCCH); the second signaling is transmitted through a Physical Downlink Shared Channel (PDSCH).

In one embodiment, the first radio signal is transmitted through a Physical Uplink Shared Channel (PUSCH).

In one embodiment, the first radio signal is transmitted through a Physical Uplink Control Channel (PUCCH).

In one embodiment, the first radio signal is transmitted through a Physical Uplink Control Channel (PUCCH).

In one embodiment, the first radio signal is transmitted through a Physical Side Link Broadcast Channel (PSBCH).

In one embodiment, the first radio signal is transmitted through a Physical Side Link Feedback Channel (PSFCH).

In one embodiment, the first slot fulfills the following condition:

$$(10*D+S) \bmod N = \text{Slot}$$

where D represents the second index; S represents a sub-frame number; N is a natural number; the first slot is a sub-frame, with its number being Slot.

In one embodiment, the first radio signal comprises a System Information Block (SIB).

In one embodiment, the first signaling comprises a System Information Block (SIB).

In one embodiment, the first signaling comprises a Master Information Block (MIB).

In one embodiment, the second signaling comprises a Timing advance (TA) signaling.

In one embodiment, the second signaling comprises a TA signaling and a fixed time offset T, where T is a real number.

In one embodiment, the second signaling comprises satellite orbit information.

In one embodiment, the second radio signal is broadcast.

In one embodiment, the second radio signal comprises a MIB.

In one embodiment, the second radio signal comprises a SIB.

In one embodiment, the second radio signal is transmitted on a PSBCH.

In one embodiment, the second signaling indicates a location of a transmitter for the second signaling, the location of the transmitter for the second signaling and the location of the first node are used to calculate a distance between the transmitter for the second signaling and the first node, the first time offset value being related to the distance between the transmitter for the second signaling and the first node.

In one embodiment, the first time offset value is linear with the distance between the transmitter for the second signaling and the first node.

In one embodiment, the second signaling contains zone information, the zone information being used to determine a location of the first node.

In one embodiment, the zone information contains a zone to which the first node belongs, a location of the zone being used for a location of the first node.

In one embodiment, the location of the zone is a location of a point within the zone.

In one embodiment, the location of the zone is a location of a central point within the zone.

Embodiment 2

Figure 2:
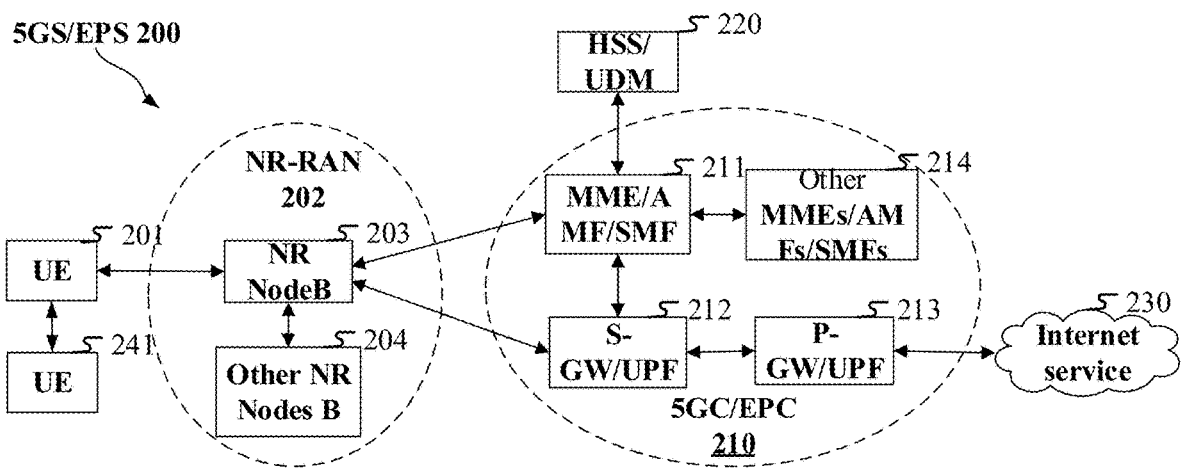
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports transmissions in NTN.

In one embodiment, the UE 201 supports transmissions in large-delay-difference networks.

In one embodiment, the UE 241 corresponds to the third node in the present disclosure.

In one embodiment, the gNB 203 corresponds to the second node in the present disclosure.

In one embodiment, the gNB 203 supports transmissions in NTN.

In one embodiment, the gNB 203 supports transmissions in large-delay-difference networks.

Embodiment 3

Figure 3:
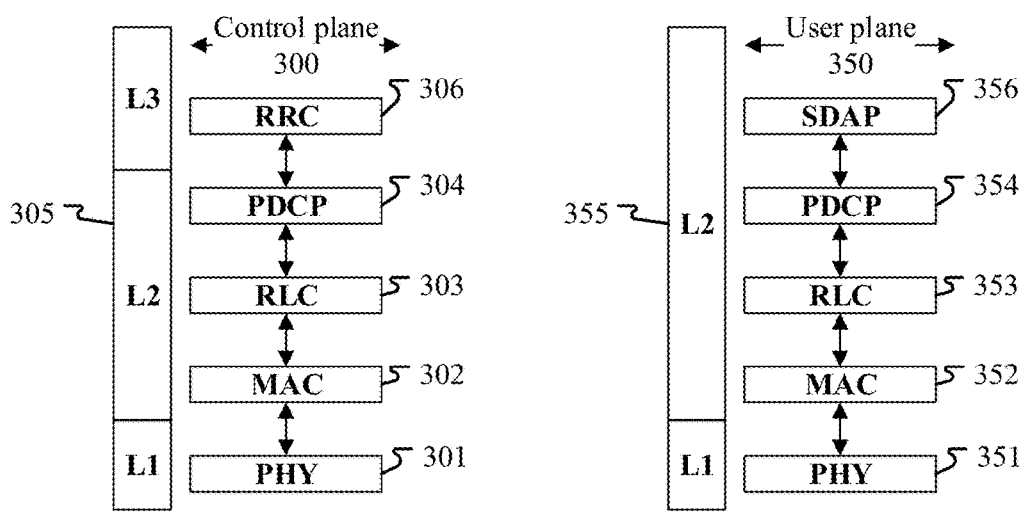
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first radio signal in the present disclosure is generated by the RRC306.

In one embodiment, the first radio signal in the present disclosure is generate by the MAC302 or the MAC352.

In one embodiment, the first radio signal in the present disclosure is generated by the PHY301 or the PHY351.

In one embodiment, the second radio signal in the present disclosure is generated by the PHY301 or the PHY351.

In one embodiment, the third radio signal in the present disclosure is generated by the RRC306.

In one embodiment, the third radio signal in the present disclosure is generate by the MAC302 or the MAC352.

In one embodiment, the third radio signal in the present disclosure is generated by the PHY301 or the PHY351.

In one embodiment, the fourth radio signal in the present disclosure is generated by the RRC306.

In one embodiment, the fourth radio signal in the present disclosure is generate by the MAC302 or the MAC352.

In one embodiment, the fourth radio signal in the present disclosure is generated by the PHY301 or the PHY351.

In one embodiment, the first signaling in the present disclosure is generated by the RRC306.

In one embodiment, the first signaling in the present disclosure is generate by the MAC302 or the MAC352.

In one embodiment, the first signaling in the present disclosure is generated by the PHY301 or the PHY351.

In one embodiment, the second signaling in the present disclosure is generated by the RRC306.

In one embodiment, the second signaling in the present disclosure is generate by the MAC302 or the MAC352.

In one embodiment, the second signaling in the present disclosure is generated by the PHY301 or the PHY351.

In one embodiment, the third signaling in the present disclosure is generated by the RRC306.

In one embodiment, the third signaling in the present disclosure is generate by the MAC302 or the MAC352.

In one embodiment, the third signaling in the present disclosure is generated by the PHY301 or the PHY351.

Embodiment 4

Figure 4:
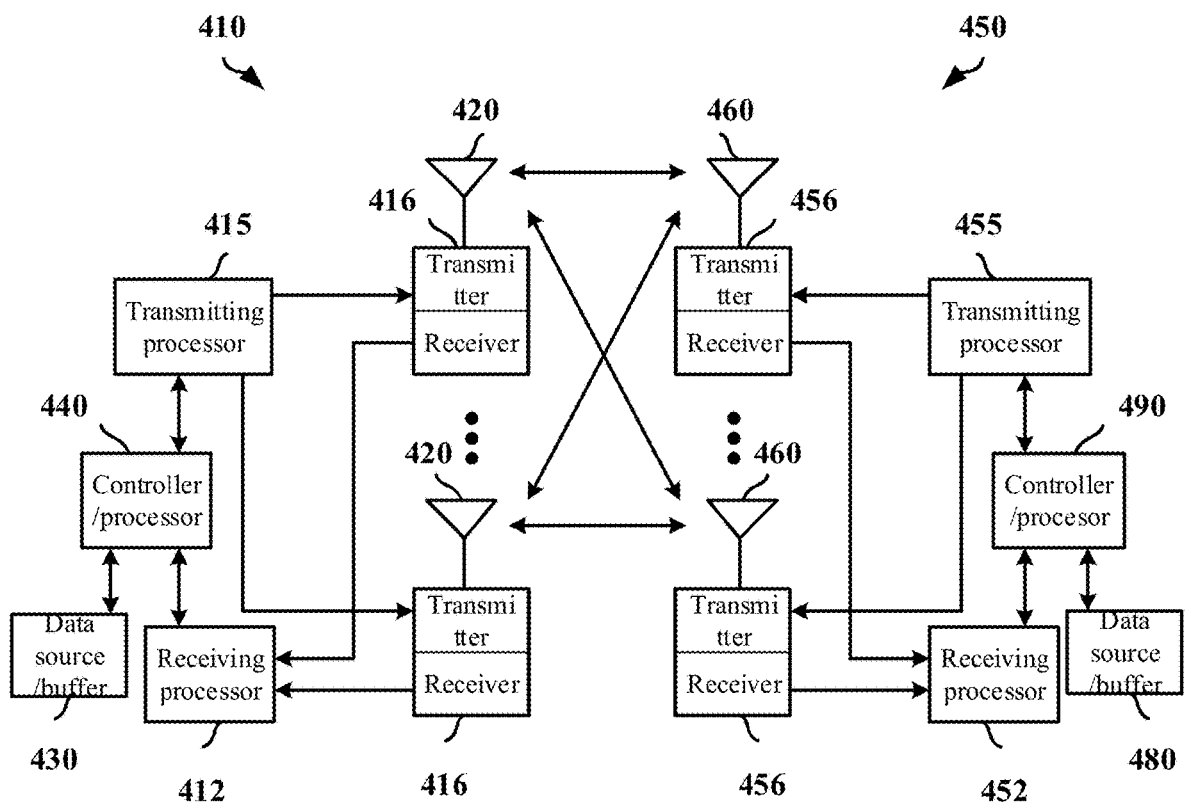
FIG. 4 illustrates a schematic diagram of a first node, a second node and a third node according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling and a second signaling; and transmits a first radio signal in a first slot; wherein, the first signaling is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the first communication device 450 comprises a memory that stores computer readable instruction program, the computer readable instruction program generates an action when executed by at least one processor, which includes: receiving a first signaling and a second signaling; and transmitting a first radio signal in a first slot; wherein, the first signaling is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first signaling and a second signaling; and receives a first radio signal in a first slot; wherein, the first signaling is used for indicating a first time window, an index for the first slot in the first time window is a first index, and the second signaling is used for determining a first time offset; the first time offset and the first index are used to determine a second index.

In one embodiment, the second communication device 410 comprises a memory that stores computer readable instruction program, the computer readable instruction program generates an action when executed by at least one processor, which includes: transmitting a first signaling and a second signaling; and receiving a first radio signal in a first slot; wherein, the first signaling is used for indicating a first time window, an index for the first slot in the first time window is a first index, and the second signaling is used for determining a first time offset; the first time offset and the first index are used to determine a second index.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first radio signal in a first slot; wherein, an index for the first slot in the second time window is a second index, and the second index is used to generate the first radio signal.

In one embodiment, the second communication device 410 comprises a memory that stores computer readable instruction program, the computer readable instruction program generates an action when executed by at least one processor, which includes: receiving a first radio signal in a first slot; wherein, an index for the first slot in the second time window is a second index, and the second index is used to generate the first radio signal.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the first communication device 450 is vehicle-mounted equipment.

In one embodiment, the second communication device 410 is a base station.

In one embodiment, the second communication device 410 is a UE.

In one embodiment, the first communication device 410 is a satellite.

In one embodiment, the receiver 456 (comprising the antenna 460), the receiving processor 452 and the controller/processor 490 are used for receiving the first signaling and the second signaling in the present disclosure.

In one embodiment, the receiver 456 (comprising the antenna 460), the receiving processor 452 and the controller/processor 490 are used for receiving the third signaling in the present disclosure.

In one embodiment, the receiver 456 (comprising the antenna 460), the receiving processor 452 and the controller/processor 490 are used for receiving the fourth signaling in the present disclosure.

In one embodiment, the transmitter 456 (comprising the antenna 460), the transmitting processor 455 and the controller/processor 490 are used for transmitting the first radio signal in the present disclosure.

In one embodiment, the transmitter 456 (comprising the antenna 460), the transmitting processor 455 and the controller/processor 490 are used for transmitting the second radio signal in the present disclosure.

In one embodiment, the transmitter 456 (comprising the antenna 460), the transmitting processor 455 and the controller/processor 490 are used for transmitting the third radio signal in the present disclosure.

In one embodiment, the receiving processor 452 determines a second index according to a first index and a first time offset.

Embodiment 5

Figure 5:
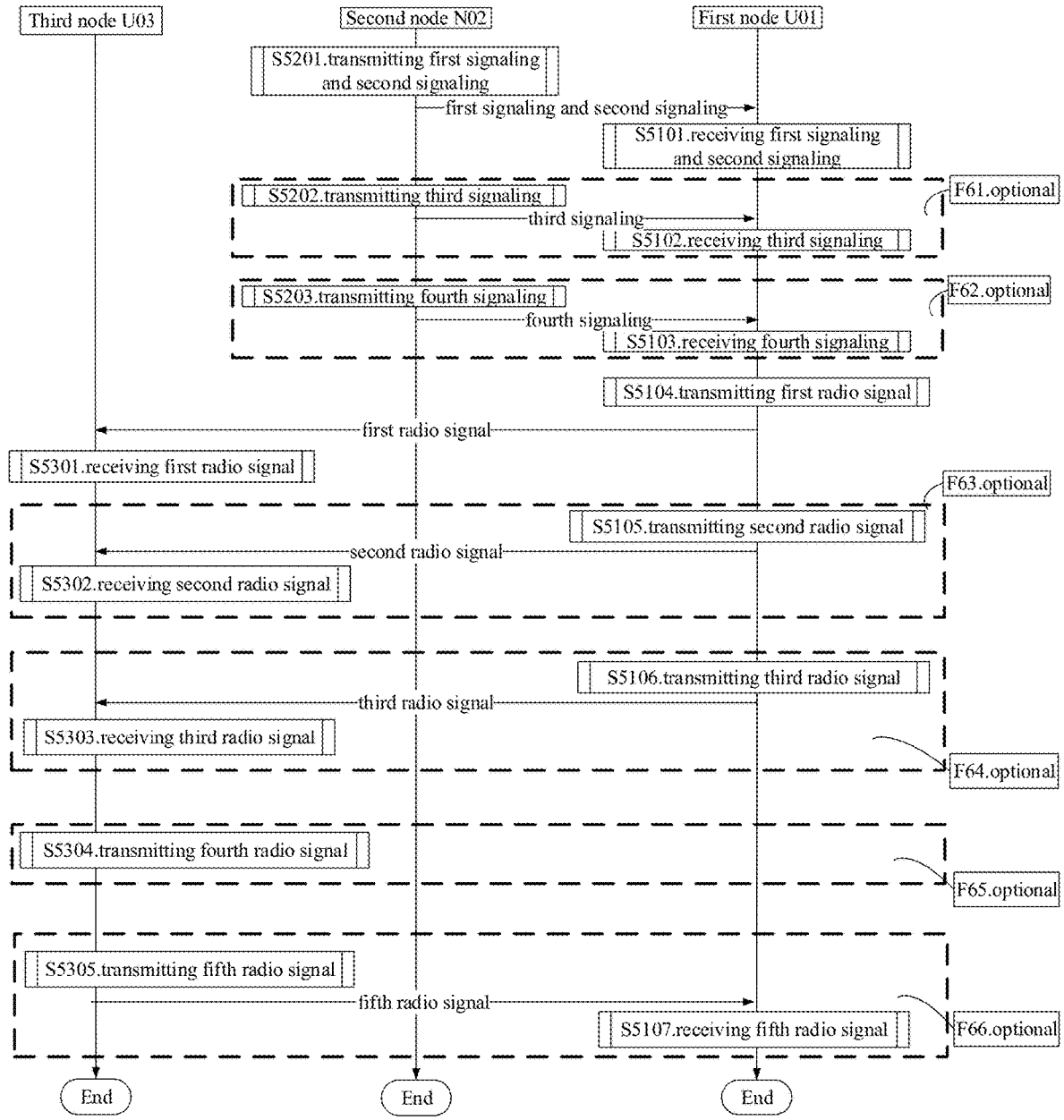
FIG. 5 illustrates a flowchart of transmission according to one embodiment of the present disclosure.

Embodiment 5 illustrates a flowchart of radio signal transmission according to one embodiment of the present disclosure, as shown in FIG. 5. In FIG. 5, a second node N02 is a base station for a serving cell of a first node U01, and U03 is a third node. It should be particularly noted that the sequence illustrated herein does not set any limit to the signal transmission order or implementation order in the present disclosure.

The second node N02 transmits a first signaling and a second signaling in step S5201; transmits a third signaling in step S5202; and transmits a fourth signaling in step S5203.

The first node U01 receives a first signaling and a second signaling in step S5101; receives a third signaling in step S5102; and receives a fourth signaling in step S5103; transmits a first radio signal in step S5104; transmits a second radio signal in step S5105; and transmits a third radio signal in step S5106; and receives a fifth radio signal in step S5107.

The third node U03 receives a first radio signal in step S5301; receives a second radio signal in step S5302; and receives a third radio signal in step S5303; transmits a fourth radio signal in step S5304; and transmits a fifth radio signal in step S5305.

In Embodiment 5, the first signaling in the present disclosure is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, an uplink for communications between the first node U01 and the second node N02 is the mainlink.

In one embodiment, a link for communications between the first node U01 and the third node U03 is the sidelink.

In one embodiment, an interface for communications between the first node U01 and the second node N02 is a Uu interface.

In one embodiment, an interface for communications between the first node U01 and the third node U03 is a PC5 interface.

In one embodiment, when the first radio signal is transmitted on a sidelink, the first radio signal is broadcast, when the first radio signal is transmitted on a mainlink, the first radio signal is unicast.

In one embodiment, when the first radio signal is transmitted on a sidelink, the first radio signal comprises a MIB.

In one embodiment, when the first radio signal is transmitted on a sidelink, the first radio signal is transmitted on a PBSCH.

In one embodiment, the second radio signal comprises a MIB.

In one embodiment, the second radio signal is transmitted on a PSBCH.

In one embodiment, the first signaling comprises a MIB.

In one embodiment, the first signaling comprises a SIB.

In one embodiment, the second signaling comprises a SIB.

In one embodiment, the second signaling is transmitted on a PDSCH.

In one embodiment, the second signaling indicates a location of a second node N02, the location of the second node N02 and the location of the first node are used to calculate a distance between the second node N02 and the first node U01, the first time offset value being related to the distance between the second node N02 and the first node U01.

In one embodiment, the first time offset value is linear with the distance between the second node N02 and the first node U01.

In one embodiment, a difference between a value of the second index and a value of the first index is equal to the first time offset.

In one embodiment, a difference between a value of the second index and a value of the first index is equal to a quantized value of the first time offset.

In one embodiment, the first time offset implicitly indicates a relationship between the second index and the first index, when the first time offset is a positive number, a difference between the second index and the first index is equal to the first time offset; when the first time offset is a negative number, a difference between the second index and the first index is equal to a pre-defined number being subtracted by the first time offset, where the pre-defined number is a real number.

In one embodiment, when the first time offset is a positive number, a difference between the second index and the first index is equal to the first time offset; when the first time offset is a negative number, a difference between the second index and the first index is equal to a pre-defined number being subtracted by the first time offset, where the pre-defined number is a real number.

In one embodiment, the third node U03 transmits a fourth radio signal, a reception timing for a synchronization signal transmitted by a synchronization reference source for the third node is used to determine a transmission timing for the fourth radio signal.

In one embodiment, the fourth radio signal is transmitted on time-frequency resources in the first time-frequency resource pool.

In one embodiment, the third node U03 considers the first node U01 as a synchronization reference source.

In one embodiment, the third node U03 considers the second node N02 as a synchronization reference source.

In one embodiment, the third node U03 considers each node potentially taken as a synchronization reference source to be a candidate synchronization reference source, and selects a candidate synchronization reference source from them for synchronization of a second time window and a first time window as a synchronization reference source.

In one embodiment, the phrase "potentially taken as" comprises acquiring a synchronization reference source identified by the candidate synchronization reference source through correct decoding.

In one embodiment, the phrase "potentially taken as" comprises correctly receiving a synchronization reference source for a synchronization signal transmitted by the candidate synchronization reference source.

In one embodiment, when the second radio signal transmitted by a candidate synchronization reference source indicates that the second time window indicated by the second radio signal is applied with time compensation, the second time window indicated by the second radio signal is considered to be synchronous with the first time window indicated by the first signaling transmitted by a synchronization reference source for the candidate synchronization reference source.

In one embodiment, the third node U03 transmits a fifth radio signal, the first radio signal is used to determine a transmission timing for the fifth radio signal, and a transmitter for the first radio signal is different from the determined synchronization reference source.

In one embodiment, a synchronization reference source selected by the third node U03 is asynchronous with the first node U01, but when the third node U03 transmits the fifth radio signal to the first node U01, it still transmits according to a timing determined by the second time window indicated by the second radio signal transmitted by the first node U01.

In one embodiment, the fifth radio signal is transmitted on time-frequency resources in the first time-frequency resource pool.

In one embodiment, the fifth radio signal is transmitted on a PSFCH.

Embodiment 6

Figure 6:
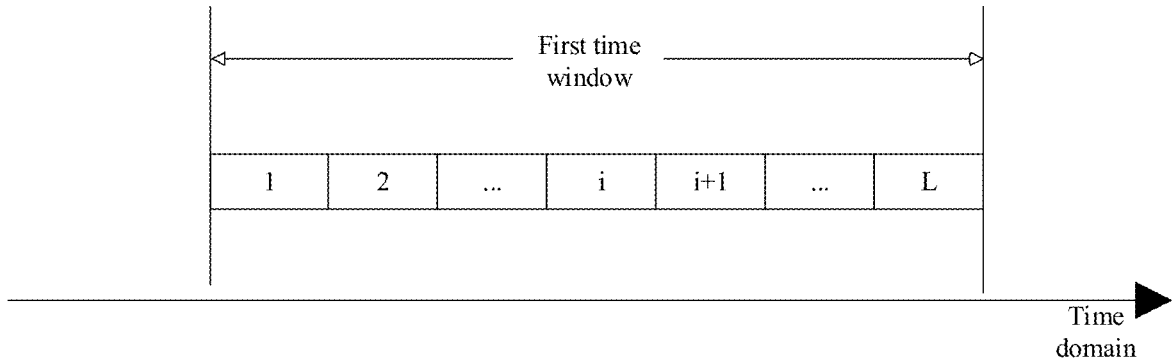
FIG. 6 illustrates a schematic diagram of a first time window, a first slot, a first index and a second index according to one embodiment of the present disclosure.

Embodiment 6 illustrates a schematic diagram of a first time window according to one embodiment of the present disclosure, as shown in FIG. 6.

In FIG. 6, each box represents a slot, the first time window being comprised of L1 slots.

In one embodiment, one slot represents a time unit, the first time window consisting of multiple time units of equal time lengths.

In embodiment, L1 is 1024, the L1 slots are contiguous.

In one embodiment, L1 is 10240, the L1 slots are contiguous.

In one embodiment, L1 is less than 1024, there is at least one slot interval, before which and after which there is a slot respectively belonging to the first time window.

In one embodiment, L1 is less than 10240, there is at least one slot interval, before which and after which there is a slot respectively belonging to the first time window.

In one embodiment when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the first index is equal to k, the second index is equal to k+m, the first time offset is equal to m, where k and m are positive integers.

In one embodiment, the first index is equal to 1, the second index is equal to 3, and the first time offset is equal to 2.

In one embodiment, the first time offset comprises a positive integer number of slot(s).

In one embodiment, a duration of the first slot does not exceed 10485.76 seconds.

In one embodiment, a duration of the first slot does not exceed 10.24 seconds.

In one embodiment, a duration of the first slot does not exceed 10 milliseconds.

In one embodiment, a duration of the first slot does not exceed 5 milliseconds.

In one embodiment, a duration of the first slot does not exceed 1 millisecond.

In one embodiment, a duration of the first slot does not exceed 0.5 millisecond.

In one embodiment, the first slot comprises 1 multicarrier symbol.

In one embodiment, the first slot comprises 7 multicarrier symbols.

In one embodiment, the first slot comprises 14 multicarrier symbols.

In one embodiment, the first slot comprises 140 multicarrier symbols.

In one embodiment, the multicarrier symbol is an Orthogonal Frequency Division Multiplexing (OFDM) Symbol.

In one embodiment, the multicarrier symbol is a Cyclic Prefix-Orthogonal Frequency-division Multiplexing (CP-OFDM) Symbol.

In one embodiment, the multicarrier symbol is a Single Carrier-Frequency Division Multiple Access (SC-FDMA) symbol.

In one embodiment, the multicarrier symbol is a Filter Bank Multicarrier (FBMC) symbol.

In one embodiment, the multicarrier symbol is a Discrete Fourier Transformation-Spread-Orthogonal Frequency Division Multiplexing (DFT-S-OFDM) Symbol.

In one embodiment, the multicarrier symbol is a Universal Filtered Multi-Carrier (UFMC) symbol.

In one embodiment, the multicarrier symbol is a Generalized frequency division multiplexing (GFDM) Symbol.

In one embodiment, the first signaling explicitly indicates the first index.

In one embodiment, the first radio signal explicitly indicates the second index.

In one embodiment, the first signaling comprises a System Frame Number (SFN) and a Timing Advance Command (TAC).

In one embodiment, the first signaling comprises a System Frame Number (SFN).

Embodiment 7

Figure 7:
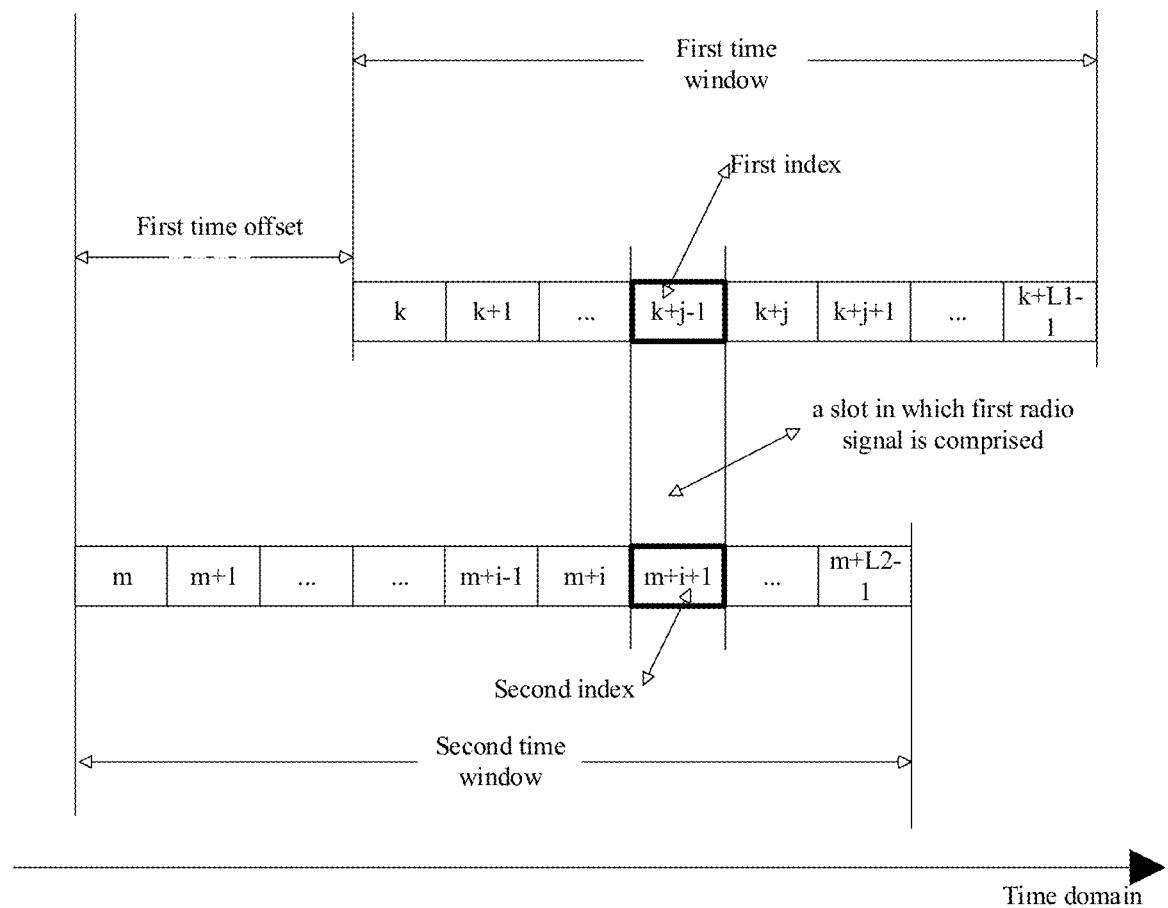
FIG. 7 illustrates a schematic diagram of a first time window, a second time window, a first slot, a first index and a second index according to one embodiment of the present disclosure.

Embodiment 7 illustrates a schematic diagram illustrating a first time window, a second time window, a first index and a second index according to one embodiment of the present disclosure, as shown in FIG. 7.

In FIG. 7, each box represents a slot, numbers k, k+1, k+j−1, k+j, k+j+1, k+L1−1 are respectively index values of the first time window, which add up to L1 indexes; numbers m, m+1, m+i−1, m+i, m+i+i and m+L2−1 are respectively indexes of the second time window, which add up to L2 indexes.

the first time window is composed of L1 slots, and the first index is an index of the first slot among the L1 slots, where L1 is a positive integer greater than 1; the second time window is composed of L2 slots, and the second index is an index of the first slot among the L2 slots, where L2 is a positive integer greater than 1.

In one embodiment, a duration of the second time window is the same as a duration of the first time window.

In one embodiment, L1 is equal to L2.

In one embodiment, L1 is unequal to L2.

In one embodiment, L1 is an integral multiple of L2.

In one embodiment, L2 is an integral multiple of L1.

In one embodiment, the one slot represents a time unit, the first time window consisting of multiple time units of equal time lengths.

In one embodiment, the one slot represents a time unit, the second time window consisting of multiple time units of equal time lengths.

In one embodiment, the one slot represents a time unit, the first time window consists of multiple time units of equal time lengths, and the second time window consists of multiple time units of equal time lengths, the length of the time unit comprised in the first time window is different from that in the second time window.

In one embodiment, a length of the first slot in a case when the first radio signal is transmitted in the first slot in the first time window is different from a length of the first slot in a case when the first radio signal is transmitted in the first slot in the second time window.

In one embodiment, a second time window is obtained by advancing the first time window by the first time offset.

In one embodiment, the second radio signal indicates a first time window and the first time offset, an index for the first slot in the first time window is the second index.

In one embodiment, L1 is 1024, the L1 slots are contiguous.

In one embodiment, L1 is 10240, the L1 slots are contiguous.

In one embodiment, L1 is less than 1024, there is at least one slot interval, before which and after which there is a slot respectively belonging to the first time window.

In one embodiment, L1 is less than 10240, there is at least one slot interval, before which and after which there is a slot respectively belonging to the first time window.

In one embodiment, L2 is 1024, the L2 slots are contiguous.

In one embodiment, L2 is 10240, the L2 slots are contiguous.

In one embodiment, L2 is less than 1024, there is at least one slot interval, before which and after which there is a slot respectively belonging to the first time window.

In one embodiment, L2 is less than 10240, there is at least one slot interval, before which and after which there is a slot respectively belonging to the first time window.

In one embodiment when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the first index is equal to k+j−1, while the second index is equal to m+i+1, where k, m, i and j are all positive integers.

In one embodiment, the second index is obtained by a time unit in the second time window corresponding to a time which is attained by advancing a time corresponding to the first index by the first time offset or by a first slot in the second time window.

In one embodiment, the first time offset comprises a positive integer number of slot(s).

In one embodiment, a duration of the first slot does not exceed 10485.76 seconds.

In one embodiment, a duration of the first slot does not exceed 10.24 seconds.

In one embodiment, a duration of the first slot does not exceed 10 milliseconds.

In one embodiment, a duration of the first slot does not exceed 5 milliseconds.

In one embodiment, a duration of the first slot does not exceed 1 millisecond.

In one embodiment, a duration of the first slot does not exceed 0.5 millisecond.

In one embodiment, the first slot comprises 1 multicarrier symbol.

In one embodiment, the first slot comprises 7 multicarrier symbols.

In one embodiment, the first slot comprises 14 multicarrier symbols.

In one embodiment, the first slot comprises 140 multicarrier symbols.

In one embodiment, the multicarrier symbol is an Orthogonal Frequency Division Multiplexing (OFDM) Symbol.

In one embodiment, the multicarrier symbol is a Cyclic Prefix-Orthogonal Frequency-division Multiplexing (CP-OFDM) Symbol.

In one embodiment, the multicarrier symbol is a Single Carrier-Frequency Division Multiple Access (SC-FDMA) symbol.

In one embodiment, the multicarrier symbol is a Filter Bank Multicarrier (FBMC) symbol.

In one embodiment, the multicarrier symbol is a Discrete Fourier Transformation-Spread-Orthogonal Frequency Division Multiplexing (DFT-S-OFDM) Symbol.

In one embodiment, the multicarrier symbol is a Universal Filtered Multi-Carrier (UFMC) symbol.

In one embodiment, the multicarrier symbol is a Generalized frequency division multiplexing (GFDM) Symbol.

In one embodiment, the first signaling explicitly indicates the first index.

In one embodiment, the first radio signal explicitly indicates the second index.

In one embodiment, the first signaling comprises a System Frame Number (SFN) and a Timing Advance Command (TAC).

In one embodiment, the first signaling comprises a System Frame Number (SFN).

In one embodiment, when a second time window transmitted by a transmitter for the first radio signal indicates that there is a non-zero offset between a start of the second time window and a start of the first time window transmitted by the transmitter for the first radio signal, the transmitter for the first radio signal is determined to be a synchronization reference source.

In one embodiment, when the second time window transmitted by a transmitter for the first radio signal contains an indication of using pre-compensation, the transmitter for the first radio signal is determined to be a synchronization reference source.

In one embodiment, when a start of the second time window transmitted by the transmitter for the first radio signal is different from a start of a synchronization time window transmitted by a synchronization reference source for the transmitter for the first radio signal, the transmitter for the first radio signal is determined to be a synchronization reference source.

In one embodiment, when the second index transmitted by a transmitter for the first radio signal is different from the first index transmitted by the transmitter for the first radio signal, the transmitter for the first radio signal is determined to be a synchronization reference source.

Embodiment 8

Figure 8:
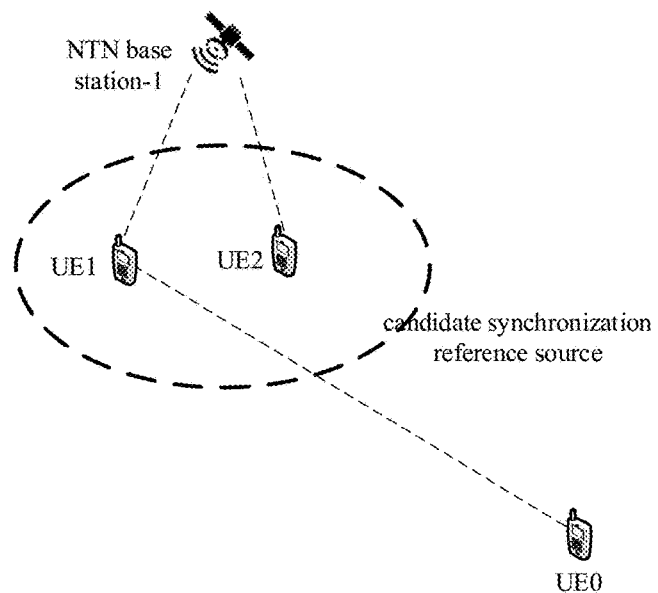
FIG. 8 illustrates a schematic diagram of selecting a synchronization reference source from multiple candidate synchronization reference sources according to one embodiment of the present disclosure.

Embodiment 8 illustrates a schematic diagram of selecting a synchronization reference source from multiple candidate synchronization reference sources according to one embodiment of the present disclosure, as shown in FIG. 8.

In Embodiment 8, candidate synchronization reference sources for UE0 include UE1 and UE2, where a synchronization reference source for the UE1 is an NTN base station-1, while a synchronization reference source for the UE2 is also the NTN base station-1. The UE0 corresponds to the third node in the present disclosure, the UE1 corresponds to the first node in the present disclosure, and the NTN base station-1 corresponds to the second node in the present disclosure.

In one embodiment, the second time window transmitted by the UE1 indicates that there is a non-zero offset between a start of the second time window and a start of the first time window transmitted by the UE1, while a start of a synchronization time window transmitted by the UE2 is equal to a start of a synchronization time window transmitted by the NTN base station-1, so the UE0 chooses the UE1 as a synchronization reference source.

In one embodiment, when the second time window transmitted by the UE1 contains an indication of using pre-compensation, the UE0 chooses a UE1 as a synchronization reference source.

In one embodiment, the pre-compensation refers to a timing advance (TA) beyond a TAC that is applied when a transmitting node is transmitting signals.

In one embodiment, a start of the second time window transmitted by the UE1 and a start of a synchronization time window transmitted by the NTN base station-1 are different, while a start of a synchronization time window transmitted by the UE2 is equal to a start of a synchronization time window transmitted by the NTN base station-1, so the UE0 chooses the UE1 as a synchronization reference source In one embodiment, the second index transmitted by the UE1 is different from the first index transmitted by the UE1, but an index for a time window used for uplink communications in a mainlink and an index for a time window used for sidelink communications transmitted by the UE2 are the same, so the UE0 chooses the UE1 as a synchronization reference source.

Embodiment 8A

Figure 8A:
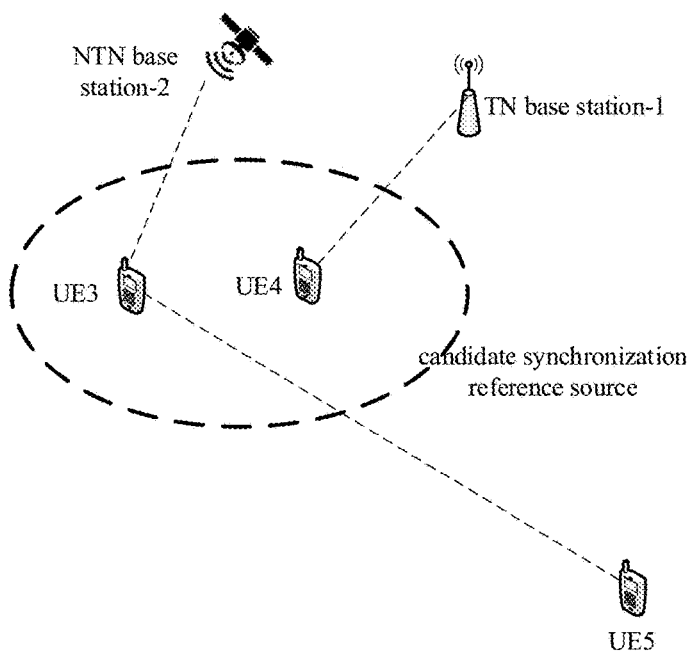
FIG. 8A illustrates a schematic diagram of selecting a synchronization reference source from multiple candidate synchronization reference sources according to one embodiment of the present disclosure.

Embodiment 8A illustrates a schematic diagram of selecting a synchronization reference source from multiple candidate synchronization reference sources according to one embodiment of the present disclosure, as shown in FIG. 8A.

In Embodiment 8A, candidate synchronization reference sources for UE5 include UE3 and UE4, where a synchronization reference source for the UE3 is an NTN base station-2, while a synchronization reference source for the UE4 is a TN base station-1. The UE5 corresponds to the third node in the present disclosure, the UE3 corresponds to the first node in the present disclosure, and the NTN base station-2 corresponds to the second node in the present disclosure.

In one embodiment, the second time window transmitted by the UE3 indicates that there is a non-zero offset between a start of the second time window and a start of the first time window transmitted by the UE3, while a start of a synchronization time window transmitted by the UE4 is equal to a start of a synchronization time window transmitted by the TN base station-1, so the UE5 chooses the UE3 as a synchronization reference source.

In one embodiment, when the second time window transmitted by the UE3 contains an indication of using pre-compensation, the UE3 is determined as a synchronization reference source.

In one embodiment, the pre-compensation refers to a timing advance (TA) beyond a TAC that is applied when a transmitting node is transmitting signals.

In one embodiment, the start of the second time window transmitted by the UE3 and a start of a synchronization time window transmitted by the NTN base station-2 are different, while a start of a synchronization time window transmitted by the UE4 is equal to a start of a synchronization time window transmitted by the TN base station-1, so the UE5 chooses the UE3 as a synchronization reference source In one embodiment, the second index transmitted by the UE3 is different from the first index transmitted by the UE3, but an index for a time window used for uplink communications in a mainlink and an index for a time window used for sidelink communications transmitted by the UE4 are the same, so the UE5 chooses the UE3 as a synchronization reference source.

Embodiment 9

Figure 9:
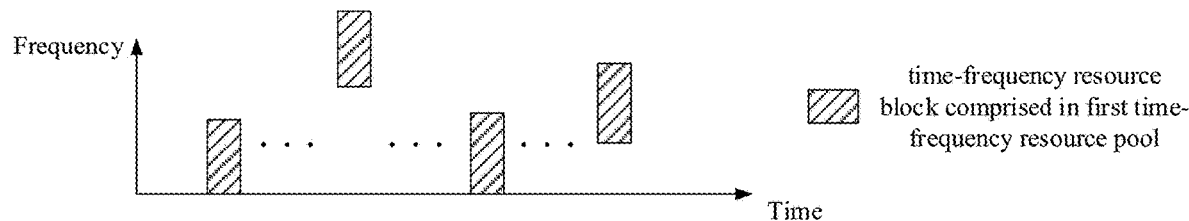
FIG. 9 illustrates a schematic diagram of a first time-frequency resource pool according to one embodiment of the present disclosure.

Embodiment 9 illustrates a schematic diagram illustrating a first time-frequency resource pool according to one embodiment of the present disclosure, as shown in FIG. 9.

In one embodiment, the first time-frequency resource pool comprises N resource blocks, where N is a natural number; each said resource block occupies a fixed period of time and frequency resource.

In one embodiment, among the N said resource blocks, any two resource blocks that are adjacent in time occupy different frequencies.

In one embodiment, among the N said resource blocks, any two resource blocks that are adjacent in frequency occupy different time.

In one embodiment, the N said resource blocks are contiguous in time.

In one embodiment, the N said resource blocks are non-contiguous in time.

In one embodiment, the N said resource blocks are non-contiguous in time, and any two said resource blocks that are adjacent are spaced by an equal interval in time.

In one embodiment, a duration of each said resource block is an OFDM symbol.

In one embodiment, a duration of each said resource block is two OFDM symbols.

In one embodiment, a duration of each said resource block is three OFDM symbols.

In one embodiment, a duration of each said resource block is 7 OFDM symbols.

In one embodiment, a duration of each said resource block is 14 OFDM symbols.

In one embodiment, a duration of each said resource block is 0.5 millisecond.

In one embodiment, a duration of each said resource block is 1 millisecond.

In one embodiment, a duration of each said resource block is 10 milliseconds.

In one embodiment, the first time-frequency resource pool is comprised of multiple slots.

In one embodiment, the first time-frequency resource pool is comprised of multiple sub-frames.

In one embodiment, the first time-frequency resource pool is comprised of multiple frames.

In one embodiment, the third radio signal indicates a first time-frequency resource pool.

In one embodiment, the first time-frequency resource pool is reserved for a D2D transmission.

In one embodiment, the first time-frequency resource pool is reserved for a V2X transmission.

In one embodiment, the first time-frequency resource pool is reserved for an NTN transmission.

In one embodiment, the first time-frequency resource pool is a D2D Resource Pool.

In one embodiment, the fourth radio signal is transmitted on time-frequency resources in the first time-frequency resource pool.

In one embodiment, the fifth radio signal is transmitted on time-frequency resources in the first time-frequency resource pool.

Embodiment 10

Figures 10, 11, 12, 13, 14, 15:
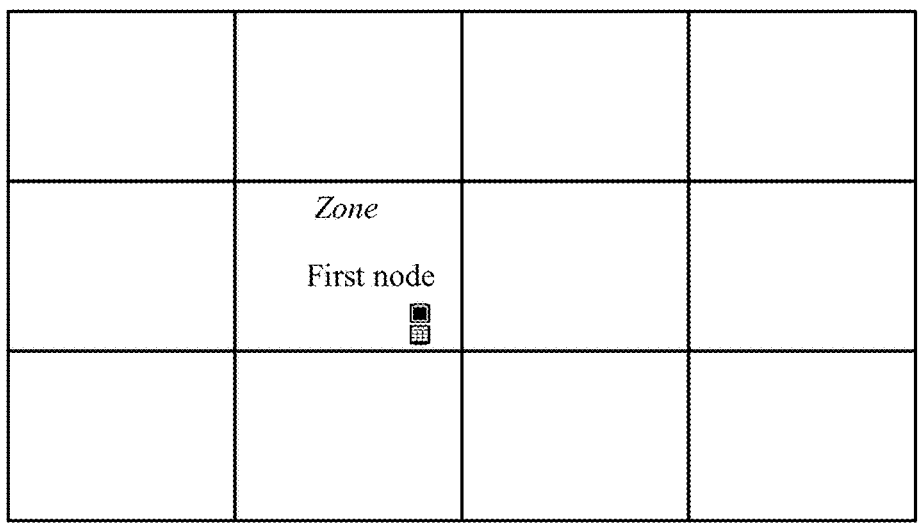
FIG. 10 illustrates a schematic diagram of zone information according to one embodiment of the present disclosure.
FIG. 11 illustrates a schematic diagram of a first signaling used to indicate a first time window according to one embodiment of the present disclosure.
FIG. 12 illustrates a schematic diagram of a second signaling used to determine a first time offset according to one embodiment of the present disclosure.
FIG. 13 illustrates a schematic diagram of a first index used to generate a first radio signal according to one embodiment of the present disclosure.
FIG. 14 illustrates a schematic diagram of a second index used to generate a first radio signal according to one embodiment of the present disclosure.
FIG. 15 illustrates a schematic diagram of a first reference time offset value set used to determine a first time offset according to one embodiment of the present disclosure.

Embodiment 10 illustrates a schematic diagram of zone information according to one embodiment of the present disclosure, as shown in FIG. 10.

In one embodiment, the second signaling contains zone information, the zone information being used to determine a location of the first node.

In one embodiment, the zone information contains a zone to which the first node belongs, a location of the zone being used for a location of the first node.

In one embodiment, the location of the zone is a location of a spot within the zone.

In one embodiment, the location of the zone is a location of a central spot within the zone.

In one embodiment, the location of the zone is determined by a group of geographical coordinates.

In one embodiment, the second signaling indicates a location of a transmitter for the second signaling, the location of the transmitter for the second signaling and the location of the first node are used to calculate a distance between the transmitter for the second signaling and the first node, the first time offset value being related to the distance between the transmitter for the second signaling and the first node.

In one embodiment, the first time offset value is linear with the distance between the transmitter for the second signaling and the first node.

Embodiment 11

Embodiment 11 illustrates a schematic diagram of a first signaling used to indicate a first time window according to one embodiment of the present disclosure, as shown in FIG. 11.

In one embodiment, the first signaling explicitly indicates the first time window.

In one embodiment, the first signaling is transmitted through a PBCH.

In one embodiment, the first signaling is transmitted through a PSBCH.

In one embodiment, the first signaling is transmitted through a PDSCH.

In one embodiment, the first signaling indicates an offset relative to an SFN, the first time window being a difference between the SFN and the offset.

In one embodiment, the first signaling indicates a duration of the first slot and a number of the first slots comprised in the first time window.

Embodiment 12

Embodiment 12 illustrates a schematic diagram of a second signaling used to determine a first time offset according to one embodiment of the present disclosure, as shown in FIG. 12.

In one embodiment, the second signaling explicitly indicates the first time offset.

In one embodiment, the second signaling is transmitted through a PBCH.

In one embodiment, the second signaling is transmitted through a PSBCH.

In one embodiment, the second signaling is transmitted through a PDSCH.

In one embodiment, the second signaling indicates a location of a transmitter for the second signaling, the location of the transmitter for the second signaling and the location of the first node are used to calculate a distance between the transmitter for the second signaling and the first node, the first time offset value being related to the distance between the transmitter for the second signaling and the first node.

In one embodiment, the first time offset value is linear with the distance between the transmitter for the second signaling and the first node.

In one embodiment, the second signaling comprises a local time compensation and a TA Command conducted by a transmitter for the second signaling, the first time offset being equal to a sum of the local time compensation value and a value of the TA Command.

In one embodiment, the second signaling comprises a TA Command, the first time offset being equal to a sum of time compensation made locally by the first node and a value of the TA Command.

In one embodiment, the second signaling contains zone information, the zone information being used to determine a location of the first node.

In one embodiment, the zone information contains a zone to which the first node belongs, a location of the zone being used for a location of the first node.

In one embodiment, the location of the zone is a location of a spot within the zone.

In one embodiment, the location of the zone is a location of a central spot within the zone.

In one embodiment, the location of the zone is determined by a group of geographical coordinates.

In one embodiment, the second signaling comprises orbit information for a transmitter for the second signaling, the first node determines a location of the transmitter for the second signaling according to the orbit information, and the location of the transmitter for the second signaling is used to calculate a distance between the transmitter for the second signaling and the first node, the first time offset value being related to the distance between the transmitter for the second signaling and the first node.

Embodiment 13

Embodiment 13 illustrates a schematic diagram of a first index used to generate a first radio signal according to one embodiment of the present disclosure, as shown in FIG. 13.

In one embodiment, the first radio signal carries the first index.

In one embodiment, the first index comprises a System Frame Number (SFN).

In one embodiment, the first index comprises a Hyper Frame Number (HFN).

In one embodiment, the first index comprises a Direct Frame Number (DFN).

In one embodiment, the first index is used for generating an initial value of a first scrambling sequence, the first scrambling sequence being used for scrambling a first bit block, the first radio signal carrying the first bit block.

In one embodiment, the initial value of the first scrambling sequence is linear with the first index.

In one embodiment, a linear correlation coefficient of the initial value of the first scrambling sequence to the first index is 512.

In one embodiment, the first index is used for generating Cyclic Redundancy Check (CRC) of a first bit block, the first radio signal carrying the first bit block.

In one embodiment, the first index is used for generating an initial value of the Cyclic Redundancy Check (CRC) of a first bit block.

In one embodiment, the first index serves as an input value for integrity protection algorithm of the first radio signal.

In one embodiment, the first index serves as an input value for encryption algorithm of the first radio signal.

In one embodiment, the first index is used to determine reception of a Search Space of the first radio signal.

In one embodiment, the first index is used to determine a resource block in which the first radio signal is comprised.

Embodiment 14

Embodiment 14 illustrates a schematic diagram of a second index used to generate a first radio signal according to one embodiment of the present disclosure, as shown in FIG. 14.

In one embodiment, the first radio signal carries the second index.

In one embodiment, the second index comprises a System Frame Number (SFN).

In one embodiment, the second index comprises a Hyper Frame Number (HFN).

In one embodiment, the second index comprises a Direct Frame Number (DFN).

In one embodiment, the second index is used for generating an initial value of a second scrambling sequence, the second scrambling sequence being used for scrambling a second bit block, the first radio signal carrying the second bit block.

In one embodiment, the initial value of the second scrambling sequence is linear with the second index.

In one embodiment, a linear correlation coefficient of the initial value of the second scrambling sequence to the second index is 512.

In one embodiment, the second index is used for generating Cyclic Redundancy Check (CRC) of a second bit block, the first radio signal carrying the second bit block.

In one embodiment, the second index is used for generating an initial value of the Cyclic Redundancy Check (CRC) of a second bit block.

In one embodiment, the second index is used for generating an initial value of the CRC of a second bit block.

In one embodiment, the first radio signal is obtained by the second bit block sequentially through Channel Coding, Scrambling, Modulation, Layer Mapping, Precoding, Resource Mapping, and OFDM Symbol Generation.

In one embodiment, the first index serves as an input value for integrity protection algorithm of the first radio signal.

In one embodiment, the first index serves as an input value for encryption algorithm of the first radio signal.

In one embodiment, the first index is used to determine reception of a Search Space of the first radio signal.

In one embodiment, the first index is used to determine a resource block in which the first radio signal is comprised.

Embodiment 15

Embodiment 15 illustrates a schematic diagram of a first reference time offset value set used to determine a first time offset according to one embodiment of the present disclosure, as shown in FIG. 15.

In one embodiment, the first reference time offset value set comprises reference time offset values for multiple beams of a transmitter for the third signaling.

In one embodiment, among reference time offset values for the multiple beams, each beam corresponds to a said reference time value.

In one embodiment, the reference time offset value is related to a distance from a transmitter for the third signaling to a center spot on the ground projected by the beam associated with the reference time value.

In one embodiment, an index for the beam is used to determine the reference time value in the first reference time offset value set.

In one embodiment, the reference time value is used for determining the first time offset.

In one embodiment, the first time offset is linear with the reference time value.

In one embodiment, the second signaling comprises a TA signaling, the first time offset being equal to a sum of the reference time value and a TA value denoted by the TA signaling.

Embodiment 16

Embodiment 16 illustrates a schematic diagram of a second signaling and a first node's location being jointly used to determine a first time offset according to one embodiment of the present disclosure, as shown in FIG. 16.

In one embodiment, the second signaling indicates a location of a transmitter for the second signaling, the location of the transmitter for the second signaling and the location of the first node are used to calculate a distance between the transmitter for the second signaling and the first node, the first time offset value being related to the distance between the transmitter for the second signaling and the first node.

In one embodiment, the second signaling comprises orbit information for a transmitter for the second signaling, the first node determines a location of the transmitter for the second signaling according to the orbit information, and the location of the transmitter for the second signaling is used to calculate a distance between the transmitter for the second signaling and the first node, the first time offset value being related to the distance between the transmitter for the second signaling and the first node.

In one embodiment, the second signaling comprises information for a distance from a transmitter for the second signaling to a reference point, the first node determines a distance from the first node to the transmitter for the second signaling according to the information for the reference point and the information for the distance from the first node to the reference point, the first time offset value being related to the distance between the transmitter for the second signaling and the first node.

In one embodiment, the second signaling comprises information for a geographical location of the reference point, the first node acquires the distance from the first node to the reference point according to the information for the geographical location of the reference point as well as information for the geographical location of the first node.

In one embodiment, the first time offset value is linear with the distance between the transmitter for the second signaling and the first node.

Embodiment 17

Embodiment 17 illustrates a schematic diagram of a second time offset used to determine a first time offset according to one embodiment of the present disclosure, as shown in FIG. 17.

In one embodiment, the fourth signaling comprises the second time offset value.

In one embodiment, the second time offset value comprises a transmission delay in a Feeder Link from a transmitter for the fourth signaling to a relay node.

In one embodiment, a transmitter for the fourth signaling is a transmitter for the second signaling.

In one embodiment, the second signaling indicates a location of a transmitter for the second signaling, the location of the transmitter for the second signaling and the location of the first node are used to calculate a distance between the transmitter for the second signaling and the first node, the first time offset value being related to the second time offset and the distance between the transmitter for the second signaling and the first node.

In one embodiment, the first time offset value is linear with a sum of a transmission delay incurred in the distance between the transmitter for the second signaling and the first node and the second time offset.

In one embodiment, the second signaling indicates a location of a transmitter for the second signaling, the location of the transmitter for the second signaling and the location of the first node are used to calculate a distance between the transmitter for the second signaling and the first node, a sum of a distance from a transmitter for the fourth signaling to the relay node and a distance from the transmitter for the second signaling to the first node is related to the first time offset.

Embodiment 18

Embodiment 18 illustrates a structure block diagram of a processing device used in a first node according to one embodiment of the present disclosure; as shown in FIG. 18. In FIG. 18, a processing device 1800 in the first node is comprised of a first receiver 1801 and a first transmitter 1802.

In Embodiment 18, the first receiver 1801 receives a first signaling, a second signaling, a third signaling and a fourth signaling; the first transmitter 1802 transmits a first radio signal, a second radio signal and a third radio signal.

In Embodiment 18, the first signaling is used for indicating a first time window, an index for the first slot in the first time window is a first index, and the second signaling is used for determining a first time offset; when the first radio signal is transmitted on a mainlink, a first index is used for generating the first radio signal; when the first radio signal is transmitted on a sidelink, a second index is used for generating the first radio signal, the second index is related to both the first time offset and the first index.

In one embodiment, the first transmitter 1802 transmits a second radio signal; wherein, the second radio signal indicates a second time window, an index for the first slot in the second time window is the second index.

In one embodiment, the first transmitter 1802 transmits a third radio signal; wherein, the third radio signal indicates a first time-frequency resource pool in the second time window.

In one embodiment, the second signaling and a location of the first node are jointly used to determine the first time offset.

In one embodiment, the first receiver 1801 receives a third signaling, the third signaling indicates a first reference time offset value set, and the first reference time offset value set is used for determining the first time offset.

In one embodiment, the first receiver 1801 receives a fourth signaling, the fourth signaling indicates a second time offset, the second time offset being used to determine the first time offset.

In one embodiment, the first node 1800 is a UE.

In one embodiment, the first node 1800 is a UE supporting large delay difference.

In one embodiment, the first node 1800 is a UE supporting NTN.

In one embodiment, the first node 1800 is an aircraft.

In one embodiment, the first node 1800 is a piece of vehicle-mounted equipment.

In one embodiment, the first node 1800 is a relay device.

In one embodiment, the first node 1800 is a vessel.

In one embodiment, the first node 1800 is an IIOT device.

In one embodiment, the first node 1800 is a piece of equipment supporting transmissions with low delay and high reliability.

In one embodiment, the first receiver 1801 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1802 comprises at least one of the antenna 452, the transmitter 454, the transmitting processor 468, the multi-antenna transmitting processor 457, the controller/processor 459, the memory 460 or the data source 467 in Embodiment 4.

Embodiment 19

Embodiment 19 illustrates a structure block diagram of a processing device used in a second node according to one embodiment of the present disclosure; as shown in FIG. 19. In FIG. 19, a processing device 1900 in a second node is comprised of a second transmitter 1901 and a second receiver 1902.

In Embodiment 19, the second transmitter 1901 transmits a first signaling, a second signaling, a third signaling and a fourth signaling; the second receiver 1902 receives a first radio signal.

In Embodiment 19, the first signaling is used for indicating a first time window, an index for the first slot in the first time window is a first index, and the second signaling is used for determining a first time offset; the first time offset and the first index are used to determine a second index.

In one embodiment, the second signaling and a location of the first node are jointly used to determine the first time offset.

In one embodiment, the second transmitter 1901 transmits a third signaling, the third signaling indicates a first reference time offset value set, and the first reference time offset value set is used for determining the first time offset.

In one embodiment, the second transmitter 1901 transmits a fourth signaling, the fourth signaling indicates a second time offset, the second time offset being used to determine the first time offset.

In one embodiment, the second node 1900 is a base station.

In one embodiment, the second node 1900 is a satellite.

In one embodiment, the second node 1900 is a UE.

In one embodiment, the second node 1900 is a Gateway.

In one embodiment, the second node 1900 is a base station supporting large delay difference.

In one embodiment, the second transmitter 1901 comprises at least one of the antenna 420, the transmitter 418, the transmitting processor 416, the multi-antenna transmitting processor 471, the controller/processor 475 or the memory 476 in Embodiment 4.

In one embodiment, the second receiver 1802 comprises at least one of the antenna 420, the receiver 418, the receiving processor 470, the multi-antenna receiving processor 472, the controller/processor 475 or the memory 476 in Embodiment 4.

Embodiment 20

Embodiment 20 illustrates a structure block diagram of a processing device used in a third node according to one embodiment of the present disclosure; as shown in FIG. 20. In FIG. 20, a processing device 2000 in the third node is comprised of a third receiver 2001.

In Embodiment 20, the third receiver 2001 receives a first radio signal, a second radio signal and a third radio signal.

In Embodiment 20, a first signaling is used for indicating a first time window, an index for the first slot in the first time window is a first index, and a second signaling is used for determining a first time offset; when a transmitter for the first radio signal transmits the first radio signal on a mainlink, the first index is used for generating the first radio signal; when the first radio signal is transmitted on a sidelink, a second index is used for generating the first radio signal, the second index is related to both the first time offset and the first index.

In one embodiment, a first signaling is transmitted by a receiver for a first radio signal transmitted on the mainlink.

In one embodiment, a first signaling is transmitted by a transmitter for the first radio signal.

In one embodiment, a second signaling is transmitted by a receiver for a first radio signal transmitted on the mainlink.

In one embodiment, a second signaling is transmitted by a transmitter for the first radio signal.

In one embodiment, a first signaling is transmitted by a serving cell for the third node.

In one embodiment, a second signaling is transmitted by a serving cell for the third node.

In one embodiment, the third receiver 2001 receives a second radio signal;

wherein, the second radio signal indicates a second time window, an index for the first slot in the second time window is the second index.

In one embodiment, the third receiver 2001 receives a third radio signal;

wherein, the third radio signal indicates a first time-frequency resource pool in the second time window.

In one embodiment, the second signaling and a location of a transmitter for the first radio signal are jointly used to determine the first time offset.

In one embodiment, the third signaling indicates a first reference time offset value set, and the first reference time offset value set is used for determining the first time offset;

wherein, the third signaling is transmitted to a transmitter for the first radio signal by the synchronization reference source for a transmitter for the first radio signal.

In one embodiment, the fourth signaling indicates a second time offset, the second time offset being used to determine the first time offset;

wherein, the fourth signaling is transmitted to a transmitter for the first radio signal by the synchronization reference source for a transmitter for the first radio signal.

In one embodiment, the third node 2000 determines a synchronization reference source;

wherein, whether the transmitter for the first radio signal is determined as a synchronization reference source is related to the second time window.

In one embodiment, the third transmitter 2002 transmits a fourth radio signal, a reception timing for a synchronization signal transmitted by a synchronization reference source determined by the third node is used to determine a transmission timing for the fourth radio signal.

In one embodiment, the third transmitter 2002 transmits a fifth radio signal, a transmission timing for a synchronization signal transmitted by a synchronization reference source determined by the third node is used to determine a transmission timing for the fourth radio signal.

In one embodiment, the third transmitter 2002 transmits a fourth radio signal on time-frequency resources in the first time-frequency resource pool.

In one embodiment, the third transmitter 2002 transmits a fifth radio signal, the first radio signal is used to determine a transmission timing for the fifth radio signal, and a transmitter for the first radio signal is different from the determined synchronization reference source determined by the third node.

In one embodiment, the third transmitter 2002 transmits the fifth radio signal on time-frequency resources in the first time-frequency resource pool.

In one embodiment, the third node 2000 is a UE.

In one embodiment, the third node 2000 is a relay device.

In one embodiment, the third receiver 2001 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present disclosure includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver for receiving a first signaling and a second signaling; and
a first transmitter for transmitting a first radio signal in a first slot;
wherein:
the first signaling is used for indicating a first time window, an index for the first slot in the first time window being a first index, and the second signaling and a location of the first node are jointly used for determining a first time offset;
when the first radio signal is transmitted on a mainlink, the first index is used for generating the first radio signal;
when the first radio signal is transmitted on a sidelink, a second index is used for generating the first radio signal, the second index is related to both the first time offset and the first index.

2. The first node according to claim 1, wherein the first transmitter is further for transmitting a second radio signal which indicates a second time window, and an index for the first slot in the second time window is the second index.

3. The first node according to claim 2, wherein the first transmitter is further for transmitting a third radio signal which indicates a first time-frequency resource pool in the second time window.

4. The first node according to claim 1, wherein the first receiver is further for receiving a third signaling which indicates a first reference time offset value set used for determining the first time offset.

5. The first node according to claim 1, wherein the first receiver is further for receiving a fourth signaling which indicates a second time offset used to determine the first time offset.

6. The first node according to claim 1, wherein a difference between the second index and the first index is equal to the first time offset.

7. A second node for wireless communications, comprising:
a second transmitter for transmitting a first signaling and a second signaling; and
a second receiver for receiving a first radio signal in a first slot;
wherein:
the first signaling is used for indicating a first time window, an index for the first slot in the first time window being a first index, and the second signaling and a location of a first node are jointly used for determining a first time offset;
when the first radio signal is transmitted on a mainlink, the first index is used for generating the first radio signal; and
when a transmitter for the first radio signal transmits the first radio signal on a sidelink, a second index is used for generating the first radio signal, the second index being related to both the first time offset and the first index.

8. The second node according to claim 7, wherein the second transmitter is further for transmitting a third signaling indicates a first reference time offset value set used for determining the first time offset.

9. The second node according to claim 7, wherein the second transmitter is further for transmitting a fourth signaling which indicates a second time offset used to determine the first time offset.

10. A third node for wireless communications, comprising:
- a third receiver for receiving a first radio signal in a first slot, a second radio signal indicating a second time window, and a third radio signal indicating a first time-frequency resource pool in the second time window, where an index for the first slot in the second time window is a second index; and
- a third transmitter for transmitting a fourth radio signal in time-frequency resources in the first time-frequency resource pool, wherein:
- a first signaling is used for indicating a first time window, an index for the first slot in the first time window being a first index, and a second signaling is used for determining a first time offset;
- when a transmitter for the first radio signal transmits the first radio signal on a mainlink, the first index is used for generating the first radio signal;
- when the first radio signal is transmitted on a sidelink, the second index is used for generating the first radio signal, the second index being related to both the first time offset and the first index; and
- a reception timing for a synchronization signal transmitted by a synchronization reference source determined by the third node is used to determine a transmission timing for the fourth radio signal.

11. A third node for wireless communications, characterized in comprising:
- a third receiver for receiving a first radio signal in a first slot, a second radio signal indicating a second time window, and a third radio signal indicating a first time-frequency resource pool in the second time window, where an index for the first slot in the second time window is a second index; and
- a third transmitter for transmitting a fifth radio signal in time-frequency resources in the first time-frequency resource pool, wherein:
- a first signaling is used for indicating a first time window, an index for the first slot in the first time window being a first index, and a second signaling is used for determining a first time offset;
- when a transmitter for the first radio signal transmits the first radio signal on a mainlink, the first index is used for generating the first radio signal;
- when the first radio signal is transmitted on a sidelink, the second index is used for generating the first radio signal, the second index being related to both the first time offset and the first index;
- the first radio signal is used to determine a transmission timing for the fifth radio signal, and
- a transmitter for the first radio signal is different from a synchronization reference source determined by the third node.

* * * * *